US011513197B2

(12) United States Patent
Yang et al.

(10) Patent No.: US 11,513,197 B2
(45) Date of Patent: Nov. 29, 2022

(54) MULTIPLE-PULSES-IN-AIR LASER SCANNING SYSTEM WITH AMBIGUITY RESOLUTION BASED ON RANGE PROBING AND 3D POINT ANALYSIS

(71) Applicant: LEICA GEOSYSTEMS AG, Heerbrugg (CH)

(72) Inventors: Quan Yang, Thornhill (CA); Zhigang Pan, Rockville, MD (US); James Chester Sanders, III, Washington, DC (US)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1035 days.

(21) Appl. No.: 16/160,885

(22) Filed: Oct. 15, 2018

(65) Prior Publication Data

US 2020/0116833 A1 Apr. 16, 2020

(51) Int. Cl.
| | | |
|---|---|---|
| G01S 7/4861 | (2020.01) | |
| G01C 15/00 | (2006.01) | |
| G01S 7/48 | (2006.01) | |
| G01S 17/89 | (2020.01) | |

(52) U.S. Cl.
CPC .......... *G01S 7/4861* (2013.01); *G01C 15/002* (2013.01); *G01S 7/4808* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 5,638,164 | A * | 6/1997 | Landau | ................. G01S 7/4802 356/5.01 |
| 6,963,354 | B1 | 11/2005 | Scheps | |
| 7,944,548 | B2 * | 5/2011 | Eaton | ..................... G01S 7/483 356/5.01 |
| 9,154,717 | B2 * | 10/2015 | Ferrano | .................. G01C 11/02 |
| 9,268,013 | B2 | 2/2016 | Rieger et al. | |
| 10,295,668 | B2 * | 5/2019 | LaChapelle | .......... G01S 7/4865 |

(Continued)

FOREIGN PATENT DOCUMENTS

| | | |
|---|---|---|
| EP | 2 694 996 B1 | 3/2015 |
| WO | WO-2018162007 A1 * | 9/2018 ............. G01S 17/10 |

OTHER PUBLICATIONS

English version of WO 2018162007 A1 (Year: 2018).*
European Search Report in Application No. 19 20 1944 dated Feb. 17, 2020.

*Primary Examiner* — Yuqing Xiao
*Assistant Examiner* — Jempson Noel
(74) *Attorney, Agent, or Firm* — Maschoff Brennan

(57) ABSTRACT

A multiple-pulses-in-air (MPiA) laser scanning system, wherein the MPiA problem is addressed in that an MPiA assignment of return pulses to send pulses of a laser scanner is based on range tracking and range probing at intermittent points in time. Each range probing comprises a time-of-flight arrangement which is constructed to be free of the MPiA problem. The invention further relates to an MPiA laser scanning system, wherein an MPiA ambiguity within a time series of return pulses, is converted into 3D point cloud space, which provides additional information from the spatial neighborhood of the points in question to enable MPiA disambiguation.

13 Claims, 6 Drawing Sheets

(56) References Cited

U.S. PATENT DOCUMENTS

| | | | |
|---|---|---|---|
| 10,345,434 B2 * | 7/2019 | Hinderling | G01S 7/487 |
| 10,620,301 B2 * | 4/2020 | Wilton | G01S 17/18 |
| 2006/0238742 A1 * | 10/2006 | Hunt | G01S 17/10 356/5.14 |
| 2012/0257186 A1 | 10/2012 | Rieger et al. | |
| 2015/0041625 A1 * | 2/2015 | Dutton | G01S 17/10 250/208.1 |
| 2016/0003946 A1 * | 1/2016 | Gilliland | G01S 17/10 356/5.01 |
| 2016/0047903 A1 * | 2/2016 | Dussan | G01S 7/4817 356/5.01 |
| 2017/0234973 A1 | 8/2017 | Axelsson | |
| 2018/0224528 A1 | 8/2018 | Rieger et al. | |

\* cited by examiner

MULTIPLE-PULSES-IN-AIR LASER SCANNING SYSTEM WITH AMBIGUITY RESOLUTION BASED ON RANGE PROBING AND 3D POINT ANALYSIS

FIELD OF INVENTION

The present invention relates to a multiple-pulses-in-air (MPiA) laser scanning system for measuring the time-of-flight of laser pulses of a laser scanner. Furthermore, the invention relates to a computer program product for measuring the time-of-flight of laser pulses of a laser scanner.

BACKGROUND

Pulse time-of-flight measuring systems are standard solutions nowadays in many different fields of application. The principle used herein substantially consists of emitting pulsed electromagnetic radiation onto a target to be surveyed and subsequently receiving the radiation that is returned by the target, wherein the distance to the target is determined on the basis of the time of flight of the pulses, i.e. the time difference between the transmission of a laser pulse (send pulse) and the reception of its echo (return) coming back from a surface. Using the speed of light, the range to the surface may be then be calculated using this measurement.

By way of example, airborne LiDAR systems (LiDAR: light detection and ranging) use the operating principle of time-of-flight (ToF) measurement to measure the distance between a LiDAR sensor in an aircraft and underlying terrain. These ranges, when combined with knowledge of the aircraft's trajectory, can in turn be used to generate a 3D point cloud containing the terrain, as well as features such as buildings and vegetation lying on top of it.

Different approaches are used to detect the returning pulses. In what is known as the threshold value method, a light pulse is detected if the intensity of the incoming radiation exceeds a specific threshold value. This threshold prevents false detection of noise and other interfering signals as useful signal, i.e. light of the emitted pulse returning from the target.

Another approach is based on the temporally very precise sampling of the detected return pulse. The electric signal generated by the detector is converted into a digital signal sequence which is subsequently processed further, typically in real time. The sampling detects both the measurement signal and the substantial noise information, which enables an increased measurement accuracy. By using a plurality of sampling points and/or by summing up the received signal synchronously to the emission rate, a useful signal can be identified even under unfavorable circumstances, e.g. enabling measurements over large distances or under noisy or disturbed background conditions.

The so-called waveform digitizing (WFD) method often scans the entire waveform of the analog signal from the radiation detected by a detector. After identification of the coding of the associated transmission signal (ASK, FSK, PSK, also called distance or interval modulation, etc.) to a received signal the signal propagation time is determined with high accuracy, e.g. by means of Fourier transformation or from a defined progression point of the sampled, digitized and reconstructed signal, such as the turning points, the curve maxima, or integrally by means of an optimum filter known from the time interpolation.

Economic motivations to reduce measurement time, e.g. flight time in an airborne LiDAR system, have incentivized an effort to accelerate data acquisition. One route to accomplish this is to increase the rate at which send pulses are transmitted from the LiDAR scanner, i.e. to increase the so-called pulse repetition frequency (PRF). However, besides hardware constraints, an increase of the pulse repetition frequency gives rise to the so-called multiple-pulses-in-air (MPiA) problem, also called multiple-time-around (MTA) problem. The MPiA problem occurs when the pulse repetition frequency is so high that the time between send pulses is shorter than the time required for an echo to return to the sensor. In this case, a return pulse from a particular transmitted pulse may arrive at the detector only after a number of other intervening transmit pulses have been sent. The received pulse must be assigned to the original send time in question to enable a correct range measurement. The process of this assignment is often referred to as MPiA or MTA disambiguation and the assignment itself is often referred to as the return pulse's MPiA or MTA zone. For example, if a return pulse is assigned to the send pulse immediately preceding it, it is assigned to MPiA zone zero, and an MPiA zone of twenty indicates that there are twenty intervening send pulses.

Furthermore, given a pair of consecutive send pulses, the echo of the latter may nevertheless arrive at the receiver before the former if it has been reflected off of a target that is closer to the detector by a wide enough margin to allow the previously emitted pulse to arrive first.

Thus, pulses returning to the laser scanner may mix with one another, i.e. return with a different sequence than that with which they were sent. For example, this may be caused by sudden distance jumps between an airborne laser scanner and the target, e.g. in areas of steep terrain or tall buildings, where the MPiA zone may rapidly change as the scanning laser passes onto and off of cliffs or building roofs.

By way of example, the MPiA problem may be conceptualized in terms of the so-called range cycle (RC), defined as half the distance light will travel during the interval between two send pulses, wherein the MPiA problem will arise if the range cycle is less than the distance from the sensor to the target, e.g. the flight altitude of an airborne laser scanner. By way of example, assuming a maximum pulse repetition frequency of 2 MHz in an airborne MPiA laser scanner results in a range cycle of roughly 75 m. In this case, a flying altitude of 2000 m will result in roughly 28 to 29 send pulses in the air at any given time. In such a scenario, each return pulse must be correctly disambiguated in order to obtain correct ranges and an accurate point cloud.

A so-called ambiguity distance is characterized by the longest distance at which the returning signal still returns to the laser scanner within a transmission period, wherein the signal can comprise one or more pulses, that is to say a pulse sequence or a burst.

EP 2 694 996 B1 describes a known approach to address the MPiA problem by using pseudorandom code sequences to modulate the position of send pulses, also known as the pulse position modulation (PPM) technique. The system cycles through a series of PPM code sequences and sequences of return pulses are then compared to the PPM codes, wherein each sequence of returns is assigned to the send pulse sequence such that the effect of the perturbation added by the modulation is minimized.

This approach has the drawback that the computational complexity rises with the number of MPiA zones that must be accommodated. This is because more codes are required for more MPiA zones and the code sequences themselves must be longer to maintain a consistent signal to noise ratio.

Thus, as all possible sequences must be compared, computation outlay for the disambiguation is significantly increased.

Another drawback arises due to the length of the code itself and the fact that all returns from the same sequence will be assigned to the same MPiA zone. For code sequences involving dozens of returns, it is likely, e.g. in urban environments, that multiple MPiA zones will actually be represented within the same sequence. Therefore, such a sequence-based approach will particularly lead to MPiA disambiguation errors in areas of rapidly changing elevation.

BRIEF SUMMARY

It is an object of some embodiments of the present invention to provide an improved MPiA laser scanning system which overcomes the above-mentioned problems.

In particular, it is an object of some embodiments of the invention to provide an MPiA laser scanning system having a more efficient and more robust measuring workflow.

These objects are achieved by realizing the features of the independent claims. Features which further develop the invention in an alternative or advantageous manner are described in the dependent patent claims.

Some embodiments of the invention relate to a multiple-pulses-in-air (MPiA) laser scanning system, particularly for aerial surveying of an overflown terrain, configured for measuring the time-of-flight of laser pulses, comprising a laser scanner with a transmitter configured for transmitting a plurality of consecutive laser pulses as send pulses towards a target, and a receiver configured for detecting the send pulses returning from the target as return pulses. The system further comprises a computing unit configured for determining a measurement value indicative of a time-of-flight of a send pulse based on an assignment of one of the return pulses to the send pulse.

According to a first aspect of some embodiments of the invention, the laser scanner is configured for executing a range probing at intermittent points in time, wherein each range probing comprises a time-of-flight arrangement which is constructed to be free of the multiple-pulses-in-air problem. Furthermore, the computing unit is configured for carrying out the assignment based on range tracking, wherein the return pulse is assigned to the send pulse by taking into account a measurement value indicative of a time-of-flight determined based on at least another of the return pulses, particularly a preceding return pulse, and by taking into account at least one probe value indicative of a time-of-flight determined based on the range probing as reliable measurement value.

By way of example, the range probing is carried out in that the laser scanner is configured to transmit the send pulses at a send pulse transmitting rate, i.e. a pulse repetition frequency, providing for a range cycle which is larger than a current distance between the laser scanner and the target, e.g. the flying altitude of an airborne laser scanner. This allows for measuring the distance to the target in an unambiguous way, e.g. for short periods of time throughout the flight.

In order to generate a 3D point cloud of the target the laser scanner is typically configured to provide or capture a variable targeting direction of transmitted send pulses, wherein the laser scanner itself may be moved with respect to the target, e.g. wherein the laser scanner is installed in an aircraft for flying over an underlying terrain, and/or the laser scanner may be configured to generate a scanning pattern on its own by directing the send pulses in different directions, e.g. by means of deflection optics and/or by mechanical steering. The 3D point cloud of the target is then generated based on the measurement value and targeting information for the send pulses defined by a scanning pattern of the laser scanner.

According to one embodiment, the laser scanner is configured for directing the send pulses towards the target according to a spatial scan pattern having spatially different scan points, and for carrying out at least part of the range probing at different scan points of the spatial scan pattern.

By way of example, for generating the spatial scan pattern, i.e. for directing the send pulses in different directions, the laser scanner may comprise at least one of movable Risley prism, a galvo-mirror, a fast steering mirror, a liquid lens, a rotating glass plate, a movable wedge prism, and a linear translation unit.

In a further embodiment, the laser scanner is configured for aerial surveying of an overflown terrain, and for generating the spatial scan pattern such that it has a transverse extension with respect to a flight direction of the laser scanner, particularly wherein the spatial scan pattern is a circular scan pattern or a zigzag scan pattern, and for carrying out at least part of the range probing at different scan points along the transverse extension, particularly at the extremes of the transverse extension.

For example, aerial LiDAR systems often operate with a circular scan pattern, e.g. using a rotating tilted deflection mirror. Due to the circular scanning and the forward flight movement of the laser scanner, a spiral scan pattern is generated on the underlying surface, wherein thanks to the spiral scan pattern, many surface points are scanned from two different viewing angles, thus minimizing shadow effects.

Typically, the MPiA assignment of one of the return pulses to the send pulse by the computing unit occurs in post-processing, e.g. by a host computer on the ground. However, the computing unit may also be configured for carrying out the assignment in parallel to the scanning process, e.g. wherein the computing unit is part of the laser scanner or connected to the laser scanner by a high-speed link. Similarly, generation of a 3D point cloud may be carried out in post-processing or by parallel processing during the scanning.

One advantage of the MPiA assignment according to the invention, i.e. based on range tracking and by taking into account at least one probe value as reliable measurement value, is that the computational complexity is independent of the number of MPiA zones that need to be tracked. In other words, the same computations will be performed whether the operating scenario involves a distance to be measured, e.g. a flying height, of 1000 m and 10 MPiA zones or a distance to be measured of 3000 m and 25 MPiA zones.

Furthermore, e.g. in contrast to the pulse position modulation technique described above, the risk of errors occurring as MPiA zones change within an analysis window is reduced because the width of subsequent analysis windows may still be kept sufficiently short.

In addition, drifts in the chronological progress of determined measurement values can be minimized and/or compensated thanks to the use of intermittent probe values as reliable measurement values.

According to one embodiment, the computing unit is configured for carrying out the assignment by taking into account the temporally closest range probing preceding the return pulse, and/or by taking into account the temporally closest range probing succeeding the return pulse.

For example, range tracking may be performed in a sequential way in intervals between consecutive range probings, also called "probe shots", wherein the assignment process is started with an initial probe shot followed by assigning the next return pulse to the send pulse such that the difference between the resulting measurement value and the probe value of the initial probe shot is minimal. This procedure is carried forward, comparing each subsequent measurement value to the previous one, until the next probe shot is encountered. Then the process begins again.

In addition, different heuristics may be employed to make the process more robust to noise or sharp changes of the target surface. Thus, instead of simply using the range probings as starting points of a sequential procedure as described above, the range probings may also be used for so-called loop closure, i.e. wherein a first return pulse assignment based on a preceding range probing is further improved based on knowledge of the probing value of the following range probing in order to generate a more accurate second return pulse assignment.

For example, in aerial surveying a history of tracked returns may be generated in order to generate, among other things, an approximation of the ground level, which is used to prevent return pulse assignments that would result in coordinates below ground level or in free-floating objects.

Accordingly, in a further embodiment, the computing unit is configured for recording a history of probe values determined from different range probings and of measurement values determined based on different return pulses, for applying a heuristic technique for approximating a shape component of the target based on the history, particularly for approximating a ground level when the laser scanner is configured for aerial surveying, and for taking into account the shape component for carrying out the assignment.

By way of a further example, the computing unit is configured for applying the heuristic technique by means of a moving analysis of the history based on a moving time window comprising multiple return pulses, wherein the moving time window has a fixed size which is larger than a time interval between consecutive range probings.

In a further embodiment, residual errors in MPiA assignments are determined for the purpose of further processing, e.g. to preferably use sequences of returns that are very likely to be correctly disambiguated for the generation of a 3D point cloud. In particular, such residual errors may be due to areas of rapid variations of the target surface or due to noise.

Accordingly, the computing unit is configured for determining a confidence level of the assignment, wherein the confidence level is determined based on at least one of a difference between the measurement value and the probe value determined from the temporally closest range probing, a similarity of different sections of a chronological course of determined measurement values, a statistical model, and a mathematical measure.

In particular, the laser scanner is configured for imprinting a regular pulse-position modulation onto the send pulses, and the computing unit is configured for determining the confidence level based on the pulse-position modulation, and a statistical method and/or mathematical measure, particularly a total variation method.

Thus, in case of a false assignment the regular pulse-position modulation of the send pulses give rise to characteristic artifacts in the data that can be detected by various mathematical measures, e.g. the total variation method. If the total variation is very low in an analysis window of return pulses, a high confidence can be attributed to these returns and it is assumed that their initial MPiA assignment is correct.

A second aspect of some embodiments of the invention, taken alone or in combination with the above, relates to a multiple-pulses-in-air (MPiA) laser scanning system, particularly for aerial surveying of an overflown terrain, configured for measuring the time-of-flight of laser pulses, comprising a laser scanner with a transmitter configured for transmitting a plurality of consecutive laser pulses as send pulses towards a target, and a receiver configured for detecting the send pulses returning from the target as return pulses. The system further comprises a computing unit configured for determining a measurement value indicative of a time-of-flight of a send pulse based on an initial assignment of one of the return pulses to the send pulse, and for generating a 3D point cloud of the target based on the measurement value and targeting information for the send pulses defined by a scanning pattern of the laser scanner.

According to this second aspect, the computing unit is configured for carrying out the initial assignment based on range tracking, wherein the return pulse is assigned to the send pulse by taking into account a measurement value indicative of a time-of-flight determined based on at least another return pulse; for determining a confidence level of the initial assignment, and for generating an alternative assignment of the return pulse to a different send pulse in case the confidence level is below a defined threshold; and for carrying out a selection of one of the assignments by respectively generating corresponding point cloud sections within the 3D point cloud, and by carrying out a comparison of the point cloud sections with the neighborhood within the 3D point cloud.

Thus, according to this aspect of some embodiments of the invention, an ambiguity within 2D space, i.e. taking into account a sequential time series of return pulses without knowledge of the targeting information for the send pulses defined by the scanning pattern, is converted into 3D space, i.e. the 3D point cloud, which provides additional information from the spatial neighborhood of the point in question.

By way of example, the confidence level is determined (in 2D space) based on at least one of a similarity of different sections of a chronological course of determined measurement values, and a mathematical measure, particularly wherein the laser scanner is configured for imprinting a regular pulse-position modulation onto the send pulses, and the computing unit is configured for determining the confidence level based on the pulse-position modulation and a mathematical measure, particularly a total variation method.

For example, alternative versions of the 3D point cloud may be generated based on the initial MPiA zone assignment of the return pulse and alternative assignments of the return pulse to MPiA zones immediately above and/or below the initially assigned MPiA zone, e.g. to the closest five MPiA zones above the initially assigned MPiA zone and the closest five MPiA zones below the initially assigned MPiA zone. These so-called redundant points are then positioned whereby they are combined with the targeting information for the send pulses, e.g. trajectory information and calibration information, to generate different versions of the 3D point cloud, or at least of a different section of the 3D point cloud so that high-confidence points, i.e. points having a confidence level above the threshold, are not duplicated. Then, an optimal version of the 3D point cloud or an optimal version of the point cloud section is chosen based on some measure taking into account the neighborhood of the point cloud section.

In particular, under the assumption that the correct MPiA assignment will probably result in the densest neighborhood of points, e.g. provided that many MPiA zones were already correctly identified using range tracking from probe shots according to the above described first aspect of the invention, a density measurement may be used to determine the optimal version.

Thus, in a further embodiment the selection is based on a density criterion for the 3D point cloud, particularly wherein it is assumed that a correct assignment leads to the highest point density within the 3D point cloud.

In some embodiments, unused assignments may be immediately removed from the 3D point cloud data, e.g. to reduce storage and computing efforts, whereas in other embodiments it may be possible to iteratively select optimal redundant points, changing parameters, and reexamining them after each iteration. In the latter case, rejected assignments/rejected redundant points are not removed from the 3D point cloud data until the final iteration, but calculation of the metric used to select them (e.g. the density) is iteratively updated.

Some embodiments of the invention further relate to a computer program product comprising program code which is stored on a machine-readable medium, or embodied by an electromagnetic wave comprising a program code segment, and has computer-executable instructions for performing, in particular when run on a computing unit of a laser scanning system according to one of the above described embodiments, at least the following steps: carrying out an initial assignment of a return pulse of a laser scanner to a send pulse of the laser scanner based on range tracking, wherein the return pulse is assigned to the send pulse by taking into account a measurement value indicative of a time-of-flight determined based on at least another return pulse of the laser scanner; determining a confidence level of the initial assignment, and generating an alternative assignment of the return pulse to a different send pulse of the laser scanner in case the confidence level is below a defined threshold; generating a 3D point cloud based on the initial assignment and targeting information for the send pulses defined by a scanning pattern of the laser scanner; and carrying out a selection of one of the assignments by respectively generating corresponding point cloud sections within the 3D point cloud, and by carrying out a comparison of the point cloud sections with the neighborhood within the 3D point cloud.

Some embodiments of the invention further relate to a computer program product comprising program code which is stored on a machine-readable medium, or embodied by an electromagnetic wave comprising a program code segment, and has computer-executable instructions for performing, in particular when run on a computing unit of a laser scanning system according to one of the above described embodiments, at least the step of carrying out an assignment of a return pulse of the laser scanner to a send pulse of the laser scanner based on range tracking, wherein the return pulse is assigned to the send pulse by taking into account a measurement value indicative of a time-of-flight determined based on at least another return pulse of the laser scanner, particularly a preceding return pulse, and by taking into account at least one probe value indicative of a time-of-flight determined based on a range probing as reliable measurement value, wherein the range probing comprises a time-of-flight arrangement which is carried out at intermittent points in time by the laser scanner and constructed to be free of the multiple-pulses-in-air problem.

BRIEF DESCRIPTION OF THE DRAWINGS

The MPiA laser scanning system according to the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
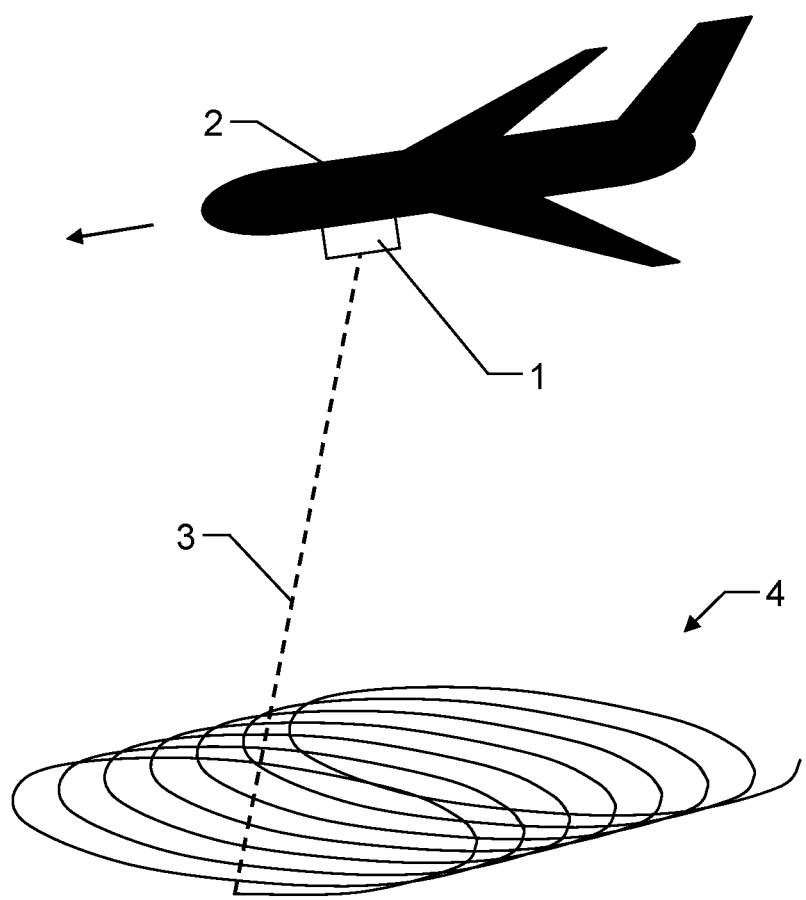
FIG. 1: an exemplary embodiment of the inventive MPiA laser scanner in the field of airborne surveying.

FIG. 1 shows an exemplary embodiment of the inventive MPiA laser scanner 1 in the field of airborne surveying, wherein the laser scanner 1 is installed in an airborne carrier, e.g. an airplane 2 or satellite. By way of example, the laser scanner 1 is configured for scanning with a circular scan pattern, e.g. using a rotating tilted deflection mirror, wherein an actual scanner pointing direction 3 is indicated. Due to the circular scanning motion by the laser scanner 1 and the forward flight movement of the carrier 2, the surface area is drawing a spiral scan pattern 4 on the ground. Thanks to the spiral scan pattern 4 many surface points will be scanned from two viewing angles, thus minimizing shadow effects.

Usually several additional or complementary data sources and measuring devices are used for improving or calibrating the LiDAR measurement, particularly additional means for determining the position and orientation of the airborne carrier 2, e.g. comprising an altimeter, a device for determining the flight attitude, e.g. giving a yaw angle, a longitudinal angle, and/or a transverse inclination angle of the airplane 2, and measured data of a satellite navigation system carried along in the airplane 2. Furthermore, a known digital 3D model of the overflown terrain might be stored on a central control device of the airplane or on the computing unit of the aerial MPiA laser scanner 1.

Figure 2:
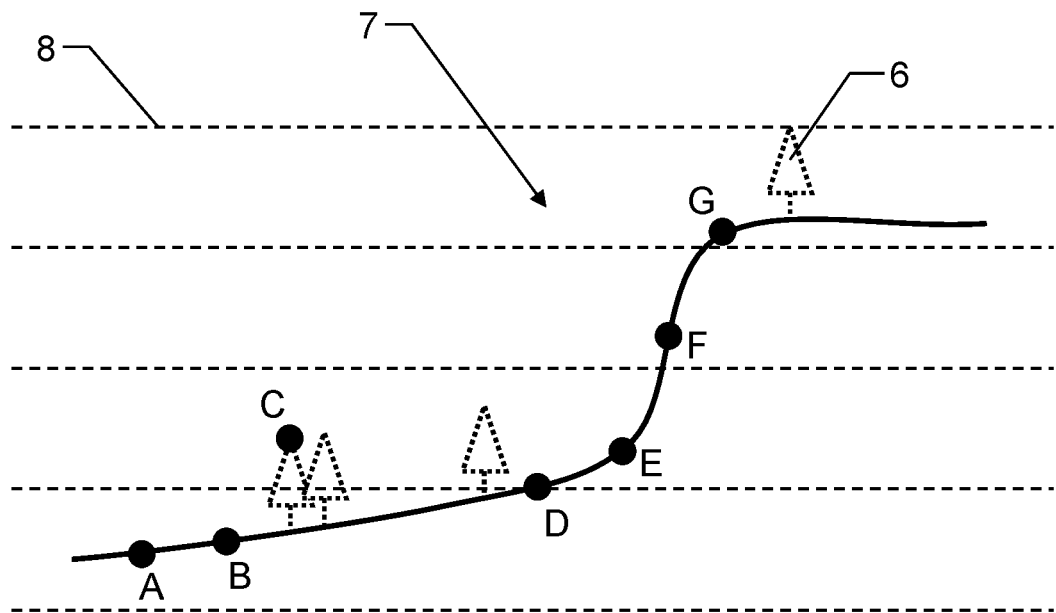
FIG. 2: schematically shows the so-called multiple-pulses-in-air (MPiA) problem.
Figure 2:
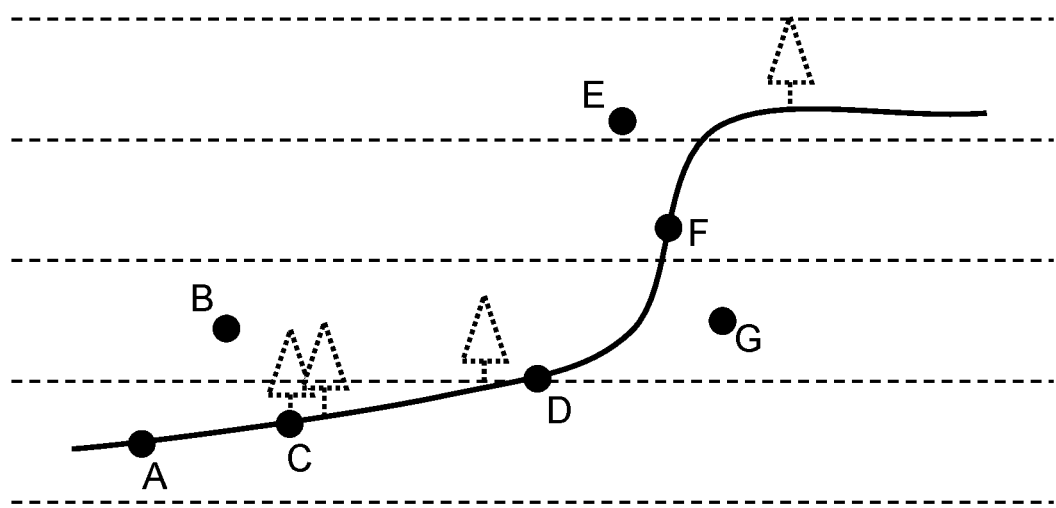

FIG. 2 schematically shows the so-called multiple-pulses-in-air (MPiA) problem occurring when the pulse repetition frequency is so high that the time between send pulses is shorter than the time required for an echo to return to the sensor. In this case there are multiple transmit pulses occurring between an initial send pulse and the reception of its echo.

The figure shows an airborne surveying scenario in which a laser scanner has been flown over an underlying terrain, from the left to the right of the figure, wherein in the top illustration return pulses A-G are correctly assigned to respective send pulses, i.e. the terrain—including vegetation 6 and a steep cliff 7—is correctly reproduced by the LiDAR scanning. In the bottom illustration some of the return pulses B, C, E, G have been incorrectly assigned and thus lead to wrong time-of-flights of the send pulses. Therefore, the terrain is not correctly mapped, wherein the map comprises "free-floating" points B, E as well as "sub-surface" points G.

Dashed horizontal lines indicate MPiA zone boundaries 8 according to the exemplary scenario described below for FIG. 3.

Figure 3:
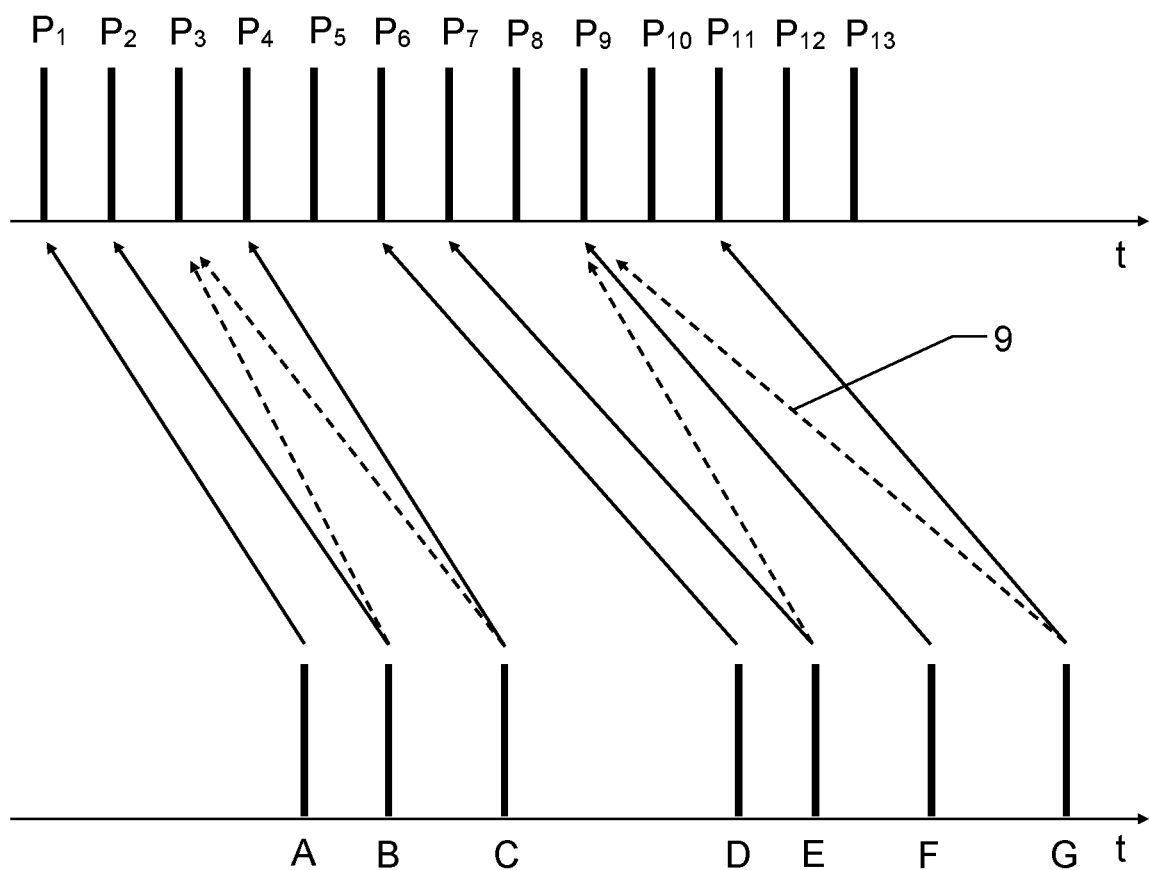
FIG. 3: schematically indicates the transmission of the send pulses and the reception of return pulses corresponding to FIG. 2 as a function of time t.

FIG. 3 corresponds to the scenario depicted by FIG. 2 and schematically indicates the transmission of the send pulses $P_1$-$P_{13}$ and the reception of return pulses A-G as a function of time t.

Although the first two send pulses $P_1$ and $P_2$ occur over terrain where the correct MPiA zone for the corresponding returns A and B is four, the tall tree encountered by the third send pulse $P_3$ results in a reduction of one MPiA zone for return pulse C. The terrain at send pulse $P_6$ is on the border between MPiA zones three and four due to the rising ground elevation (return pulse D). The steep terrain overflown at send pulses $P_{7-11}$ results in a rapid transition from MPiA zone three to MPiA zone one for return pulses E, F, and G as the range (and thus the time-of-flight) between the ground and sensor is reduced.

Tall objects such as trees (return pulse C), steep terrain (return pulses E, F, and G), and even gradual terrain changes (return pulse D), will, in general, lead to MPiA zone transitions that complicate the MPiA problem. Erroneous disambiguation 9 will lead to incorrect range calculation and the artifacts noted in the lower illustration of FIG. 2.

Figure 4:
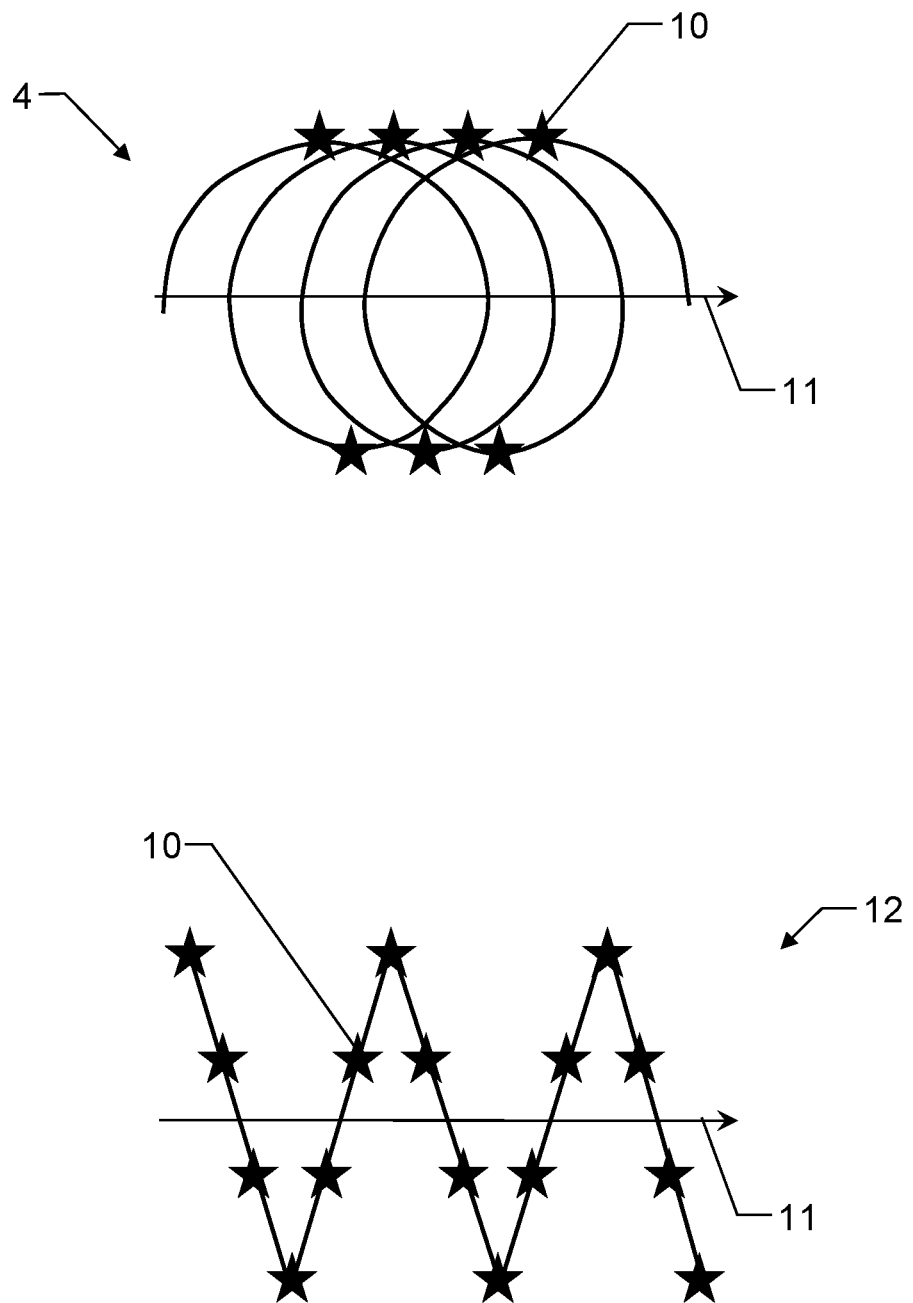
FIG. 4: schematically shows a first aspect of the invention, wherein the MPiA problem is addressed by range tracking involving range probing.

FIG. 4 exemplarily shows a first aspect of the invention, wherein the MPiA problem is addressed in that the laser scanner is configured for carrying out a range probing 10 at intermittent points in time, wherein each range probing 10 comprises a time-of-flight arrangement which is laid out to be free of the multiple-pulses-in-air problem, e.g. wherein the pulse repetition frequency is lowered in order to provide for a range cycle which is larger than a flight altitude. On that basis, the MPiA laser scanning system is configured for carrying out the MPiA assignment of the return pulses A-G to respective send pulses $P_1$-$P_{13}$ (FIG. 3) based on range tracking, i.e. taking into account ranges determined by assignments of neighboring return pulses to send pulses, and based on probe values from the range probing 10.

By way of example, as depicted in the top illustration, the laser scanner is configured for generating a spatial scan pattern, here a circular scan pattern 4, such that it has a transverse extension with respect to a flight direction 11 of the laser scanner. In this example, the laser scanner is configured for carrying out range probing 10 at the extremes of the transverse extension.

Alternatively, the range probing 10 may be carried out at any other fixed or variable repetition rate, e.g. based on a known surface model of the overflown terrain and/or based on a set point density of the LiDAR measurement. For example, as depicted in the bottom illustration, the laser scanner is configured for generating a zigzag scan pattern 12, wherein range probing 10 is evenly distributed over the spatial scan pattern 12.

Figure 5:
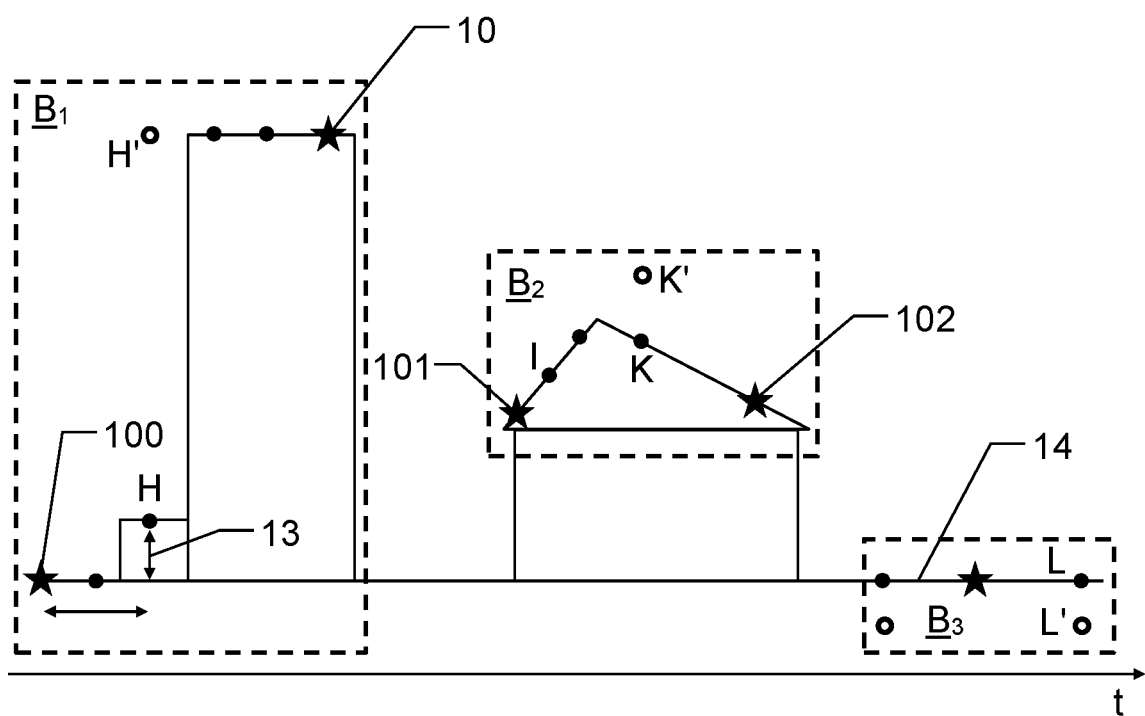
FIG. 5: exemplarily shows different aspects of post-processing making use of probe shots and range tracking.

FIG. 5 exemplarily shows different aspects of post-processing making use of probe shots 10 (range probings) and range tracking for carrying out the assignment of return pulses to send pulses. The figure shows an airborne surveying scenario in which a laser scanner has been flown over an urban area comprising buildings of different height. Various return pulses from probe shots 10 and measurement shots are shown as a function of detection time t of the respective return pulses.

Now referring to the return pulses within the left analysis box $B_1$, the computing unit is configured for carrying out the assignment by taking into account the temporally closest range probing with respect to a return pulse to be assigned. For example, in the transition from the left small building to the skyscraper an ambiguity H' of a return pulse H associated to a hit position on the small building may be resolved by taking into account the temporally closest probe shot 100, such that the difference 13 between the resulting height and the height indicated by the temporally closest probe shot 100 is minimal.

Now referring to the return pulses within the central analysis box $B_2$, the computing unit is configured for so-called loop closure, i.e. wherein analysis may have started based on a preceding probe shot 101, wherein in a first step range tracking is performed in a sequential way by assigning the next return pulse I to the send pulse such that the difference between the resulting measurement value and the probe value of the initial probe shot 101 is minimal. This procedure is carried forward, comparing each subsequent measurement value to the previous one. However, by taking into account only preceding return pulses an ambiguity K' may still be incorrectly resolved, e.g. wherein the ambiguity K' is resolved based on an estimated slope associated to preceding assignments. Therefore, different heuristics may be employed to make the process more robust to noise or sharp changes of the target surface.

For example, instead of simply using a sequential procedure as described above, the range probings may also be used for so-called loop closure, e.g. wherein a surface slope is also estimated "backwards" by taking into account another probe shot 102, here the following probe shot, in order to support correct assignment of the return pulse K.

By way of another example, referring now to the right analysis box $B_3$, a history of tracked returns may be generated in order to approximate, among other things, a ground level 14, such that an ambiguity L' is immediately discarded as being below the surface in order to correctly assign the corresponding return pulse L.

Figure 6:
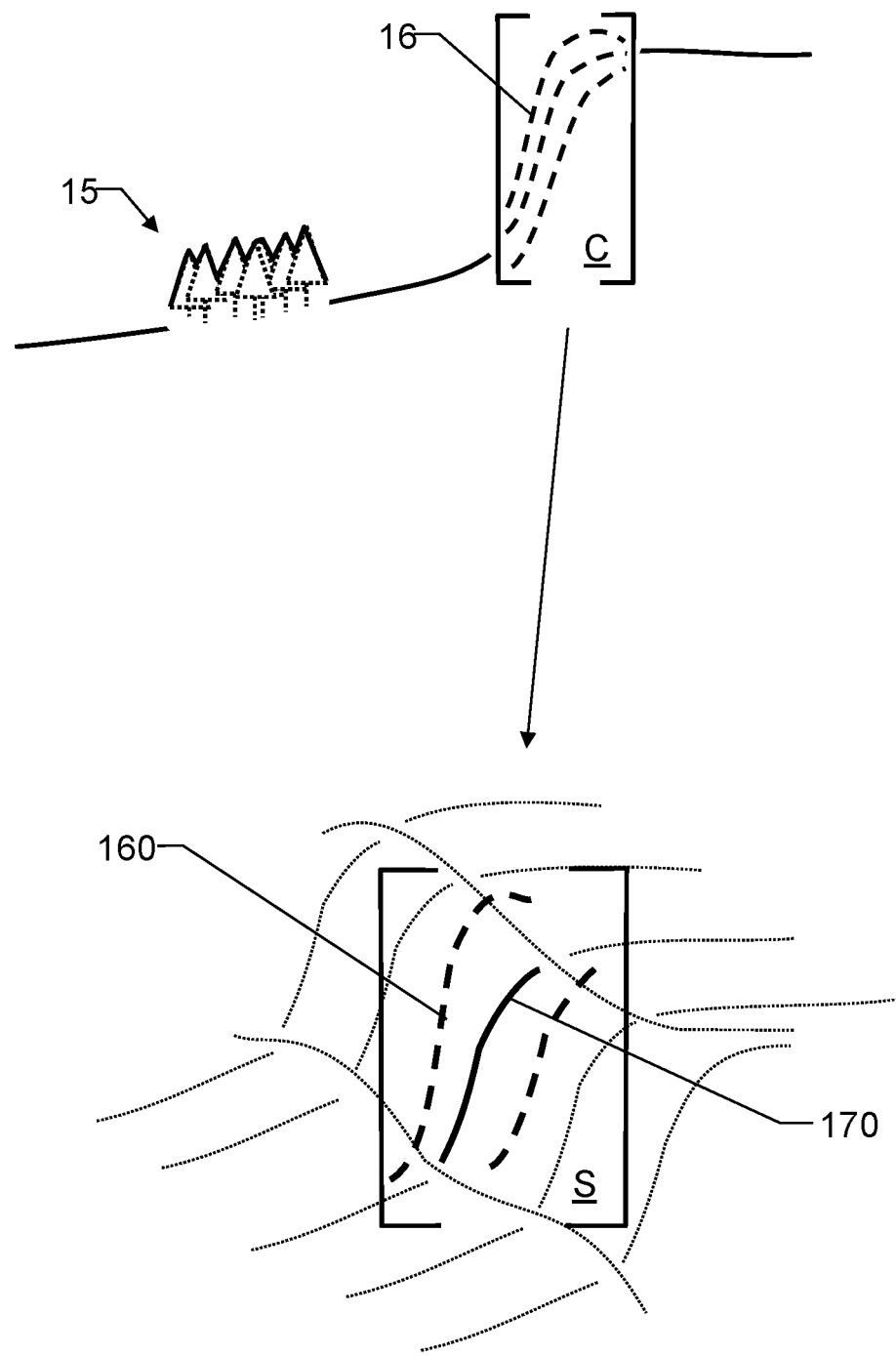
FIG. 6: exemplarily shows a second aspect of the invention, wherein an MPiA ambiguity within 2D space is resolved based on an analysis in 3D space.

FIG. 6 exemplarily shows a second aspect of the invention, wherein an MPiA ambiguity within 2D space (top illustration), spanned by sequential time series of return pulses, is converted into the 3D point cloud space (bottom illustration), which provides additional information from the spatial neighborhood of the points in question.

By way of example, a confidence level for the MPiA assignment is determined in 2D space based on a total variation method, wherein the transmitter of the laser scanner is configured for imprinting a regular pulse-position modulation onto the send pulses.

Based on this assessment a critical area C is identified comprising a set of return pulse assignments with a confidence level below a defined threshold. For example, the 2D assessment may provide reasonable indication that a first range jump 15, e.g. over only one or two MPiA zones, is associated to a group of trees and thus it is assumed that here the MPiA assignment is correct. However, 2D analysis may not be able to resolve the jump associated with a steep cliff which extends over a multitude of MPiA zones.

Therefore, the problem is transferred to 3D space in that alternative versions of the 3D point cloud section related to the critical area C are generated based on different MPiA zone assignments of the return pulses within the critical area C, so-called redundant points 16. These redundant points 16 are combined with trajectory information and calibration information in order to be positioned as alternative patches 160 within the section S of the 3D point cloud associated to the critical area C. Then, an optimal version of the 3D point cloud section S, i.e. the best patch 170, is chosen based on comparing the alternative patches 160 with their neighborhood of the point cloud section S.

By way of example, provided that many MPiA zones were already correctly identified in 2D using range tracking from probe shots according to the above described first aspect of the invention, a density measurement may be used to determine the optimal patch 170.

Although the invention is illustrated above, partly with reference to some preferred embodiments, it must be understood that numerous modifications and combinations of different features of the embodiments can be made. All of these modifications lie within the scope of the appended claims.

What is claimed is:

1. A multiple-pulses-in-air (MPiA) laser scanning system configured for measuring the time-of-flight of laser pulses taking into account MPiA ambiguities, comprising:
    a laser scanner including:
        a transmitter configured for transmitting a plurality of consecutive laser pulses as send pulses towards a target, and
        a receiver configured for detecting the send pulses returning from the target as return pulses, wherein the send pulses are transmitted at such a pulse repetition frequency that a time between transmission of two consecutive send pulses is shorter than a time between transmission of one of the two send pulses and reception of its echo returning from a distance within a nominal distance measurement range of the laser scanner; and
    a computing unit configured to provide an assignment of one of the return pulses to one of the send pulses by MPiA disambiguation and, based thereof, to determine a measurement value indicative of a time-of-flight of the one of the send pulses,
    wherein the laser scanner is configured for executing a range probing at intermittent points in time, wherein the range probing is carried out by an adjustment of the pulse repetition frequency to provide a probe shot for the MPiA disambiguation, the probe shot involving transmission and reception of a laser pulse in a time-of-flight arrangement which is constructed to be free of the multiple-pulses-in-air problem, and
    wherein the computing unit is configured for carrying out the assignment based on range tracking, wherein for the MPiA disambiguation the one of the return pulses is assigned to the one of the send pulses by taking into account a measurement value indicative of a time-of-flight determined based on at least another of the return pulses and the MPiA disambiguation takes into account at least one probe value indicative of a time-of-flight determined based on the probe shot of the range probing by assuming the probe value being a reliable measurement value.

2. The laser scanning system according to claim 1, wherein the laser scanner is configured:
    to direct the send pulses towards the target according to a spatial scan pattern having spatially different scan points, and
    to carry out at least part of the range probing at different scan points of the spatial scan pattern.

3. The laser scanning system according to claim 2, wherein the laser scanner is configured for aerial surveying of an overflown terrain, generating the spatial scan pattern such that it has a transverse extension with respect to a flight direction of the laser scanner, and for carrying out at least part of the range probing at different scan points along the transverse extension.

4. The laser scanning system according to claim 1, wherein the computing unit is configured for carrying out the assignment by taking into account the temporally closest range probing preceding the return pulse, or by taking into account the temporally closest range probing succeeding the return pulse.

5. The laser scanning system according to claim 1, wherein the computing unit is further configured:
    to record a history of probe values determined from different range probings and of measurement values determined based on different return pulses,
    to apply a heuristic technique for approximating a shape component of the target based on the history, and
    to take into account the shape component for carrying out the assignment.

6. The laser scanning system according to claim 5, wherein
    the computing unit is configured for applying the heuristic technique by means of a moving analysis of the history based on a moving time window comprising multiple return pulses,
    wherein the moving time window has a fixed size which is larger than a time interval between consecutive range probings.

7. The laser scanning system according to claim 1, wherein the computing unit is further configured for determining a confidence level of the assignment, wherein the confidence level is determined based on at least one of:
    a difference between the measurement value and the probe value determined from the temporally closest range probing,
    a similarity of different sections of a chronological course of determined measurement values,
    a statistical model, and
    a mathematical measure.

8. The laser scanning system according to claim 7, wherein:
    the laser scanner is configured for imprinting a regular pulse-position modulation onto the send pulses, and
    the computing unit is configured for determining the confidence level based on the pulse-position modulation, and a statistical method or mathematical measure.

9. The laser scanning system according to claim 1, wherein the computing unit is configured
    to generate a 3D point cloud of the target based on the measurement value and targeting information for the send pulses defined by a scanning pattern of the laser scanner,
    to determine a confidence level of the assignment, and for generating an alternative assignment of the one of the return pulses to a different send pulse in case the confidence level is below a defined threshold, and
    to carry out a selection of one of the assignments by respectively generating corresponding point cloud sections within the 3D point cloud, and by carrying out a comparison of the point cloud sections with the neighborhood within the 3D point cloud.

10. The laser scanning system according to claim 9, wherein the confidence level is determined based on at least one of a similarity of different sections of a chronological course of determined measurement values, a statistical model, and a mathematical measure.

11. The laser scanning system according to claim 9, wherein the selection is based on a density criterion for the 3D point cloud.

12. A computer program product comprising program code which is stored on a non-transitory machine-readable medium having computer-executable instructions which, when run on a computing unit of a laser scanning system according to claim 1, cause the computing unit to perform:
carrying out an initial assignment of a return pulse of a laser scanner to a send pulse of the laser scanner based on range tracking, wherein the return pulse is assigned to the send pulse by taking into account a measurement value indicative of a time-of-flight determined based on at least another return pulse of the laser scanner,
determining a confidence level of the initial assignment, and generating an alternative assignment of the return pulse to a different send pulse of the laser scanner in case the confidence level is below a defined threshold,
generating a 3D point cloud based on the initial assignment and targeting information for the send pulses defined by a scanning pattern of the laser scanner, and
carrying out a selection of one of the assignments by respectively generating corresponding point cloud sections within the 3D point cloud, and by carrying out a comparison of the point cloud sections with the neighborhood within the 3D point cloud.

13. A computer program product comprising program code which is stored on a non-transitory machine-readable medium having computer-executable instructions for performing:
carrying out an assignment of a return pulse of a laser scanner to a send pulse of the laser scanner by MPiA disambiguation based on range tracking, wherein
for the MPiA disambiguation the return pulse is assigned to the send pulse by taking into account a measurement value indicative of a time-of-flight determined based on at least another return pulse of the laser scanner, and
the MPiA disambiguation takes into account at least one probe value indicative of a time-of-flight determined based on a range probing by assuming the probe value being as reliable measurement value, wherein each range probing is carried out by an adjustment of the pulse repetition frequency to provide a probe shot for the MPiA disambiguation, the probe shot involving transmission and reception of a laser pulse in a time-of-flight arrangement which is carried out at intermittent points in time by the laser scanner and constructed to be free of the multiple-pulses-in-air problem.

* * * * *